United States Patent [19]

Burgess et al.

[11] 4,341,679
[45] Jul. 27, 1982

[54] VINYLIDENE CHLORIDE CO-POLYMER LATEX COMPOSITIONS

[75] Inventors: Anthony J. Burgess; David L. Gardner, both of Runcorn, England

[73] Assignee: Imperial Chemical Industries Limited, London, England

[21] Appl. No.: 860,312

[22] Filed: Dec. 12, 1977

[30] Foreign Application Priority Data

Dec. 20, 1976 [GB] United Kingdom ............... 53021/76

[51] Int. Cl.$^3$ ............................................. C08L 27/16
[52] U.S. Cl. .................................... 524/833; 428/442; 428/500; 526/317
[58] Field of Search ............................ 526/317, 329.4; 260/29.6 TA

[56] References Cited

U.S. PATENT DOCUMENTS

| | | | |
|---|---|---|---|
| 2,570,478 | 10/1951 | Pitzl | 260/78.5 |
| 2,829,069 | 4/1958 | Michel | 526/329.4 |
| 3,226,370 | 12/1965 | Poindexter | 526/317 |
| 3,468,703 | 9/1969 | Gibbs et al. | 117/155 |
| 3,696,082 | 10/1972 | Smith | 526/317 |
| 3,706,722 | 12/1972 | Nelson et al. | 260/85.5 |
| 3,714,106 | 1/1973 | Smith et al. | 260/29.6 TA |
| 3,787,232 | 1/1974 | Mikofalvy et al. | 117/155 UA |
| 3,804,814 | 4/1974 | Fassy et al. | 526/317 |

FOREIGN PATENT DOCUMENTS 605517 7/1948 United Kingdom .
761838 11/1956 United Kingdom .

*Primary Examiner*—Harry Wong, Jr.
*Attorney, Agent, or Firm*—Cushman, Darby & Cushman

[57] ABSTRACT

An aqueous latex of a copolymer derived from defined relative proportions of (i) vinylidene chloride, (ii) vinyl chloride, (iii) an alkyl acrylate or methacrylate and (iv) an unsaturated carboxylic acid forms stable protective films on a variety of substrates.

12 Claims, No Drawings

VINYLIDENE CHLORIDE CO-POLYMER LATEX COMPOSITIONS

This invention relates to water-based surface coating compositions and to copolymers for use in such compositions.

According to the present invention there is provided a copolymer derived from (i) vinylidene chloride, (ii) vinyl chloride, (iii) one or more alkyl acrylates having from 1 to 12 carbon atoms in the alkyl group and/or one or more alkyl methacrylates having from 2 to 12 carbon atoms in the alkyl group and (iv) one or more aliphatic alpha-beta-unsaturated carboxylic acids, the proportion of vinylidene chloride being from 65 to 90 parts by weight, the proportion of the said alkyl acrylates and/or methacrylates being from 2 to 15 parts by weight and the proportion of the said carboxylic acids being from 0.2 to 8 parts by weight, per hundred parts by weight of the total vinylidene chloride and vinyl chloride.

A water-based latex comprising one or more copolymers according to the present invention forms stable films which has excellent protective properties on a variety of substrates (especially metallic substrates, for example steel), the films having good chemical resistance, low permeability to water vapour and being compatible with most anti-corrosive pigments.

The proportion of vinylidene chloride is preferably from 70 to 80 parts by weight per hundred parts by weight of total vinylidene chloride and vinyl chloride.

The proportion of the said alkyl acrylate(s) and/or methacrylate(s) is preferably from 4 to 10 parts by weight per hundred parts by weight of total vinylidene chloride and vinyl chloride.

The proportion of the carboxylic acid(s) is preferably from 1 to 4 parts by weight per hundred parts by weight of total vinylidene chloride and vinyl chloride.

The preferred alkyl acrylate is 2-ethylhexyl acrylate; other alkyl acrylates which may be used include methyl acrylate and butyl acrylate; alkyl methacrylates which may be used include butyl methacrylate and 2-ethylhexyl methacrylate.

The preferred carboxylic acid is acrylic acid; other carboxylic acids which may be used include methacrylic acid, itaconic acid and citraconic acid.

Thus the preferred copolymers are those derived from vinylidene chloride, vinyl chloride, 2-ethylhexyl acrylate and acrylic acid.

The copolymerisation may be carried out by well-established emulsion techniques involving, for example, copolymerisation in an aqueous medium with the aid of a free-radical initiator and usually in the presence of a surface-active agent.

In a preferred method of copolymerisation, at least a major proportion of the vinyl chloride component (preferably the whole of the vinyl chloride component) is present in the reaction vessel from the start of the reaction, together with a portion of the other monomer components, the remaining portions of the monomers being introduced (preferably as a mixture thereof) during the course of the reaction.

The copolymers of the present invention may be prepared by the same general method as that described in the Examples of our UK Specification No. 1,398,392, which relates to certain copolymers derived from vinylidene chloride, vinyl chloride and at least two additional monomers.

The proportion of the alkyl acrylate and/or methacrylate component in the reaction mixture at the start of the reaction is preferably lower than the porportion thereof in the mixture introduced during the reaction.

The copolymer latex may be used directly as a surface-coating composition (or as a component in the formulation of a surface-coating composition, for example a paint composition).

The copolymer is preferably such that the latex has a minimum film-forming temperature which is below the normal temperature range encountered during application to a substrate. Thus the minimum film-forming temperature is preferably below 30° C., for example from −10° C. to 20° C., especially from 6° C. to 15° C.

The invention is illustrated by the following Examples. Unless otherwise stated all parts and percentages are by weight.

EXAMPLE 1

An aqueous copolymer latex containing vinylidene chloride 69.9%, vinyl chloride 22.4%, 2-ethylhexyl acrylate 5.9%, and acrylic acid 1.8% was prepared by copolymerisation in an autoclave at 60° C., using sodium lauryl sulphate as surface-active agent, ammonium persulphate as initiator and sodium metabisulphite as activator. The weight of vinylidene chloride monomer employed was 44.9 kg.

115.5 kg of latex with a solids content of 53.8% were recovered from the autoclave. The latex had a minimum film-forming temperature of 12° C. The latex, when neutralised to pH 7 with ammonia solution and thickened by the addition of 0.2% 'Thickener LN' (GAF Corporation, USA) was applied to mild steel using a No. 8 Meyer bar. The film was allowed to dry overnight and then a second coat was applied in the same manner. The coated panel passed 50 in lb in the 'Gardner Reverse Impact Tester' (ASTM D2794-69) and had excellent adhesion (GTO rating according to German standard test DN 53151). A similarly coated panel was scored through to the substrate with a cross-cut and put in a salt-spray cabinet (conforming to BS 3900 part F4 'Exposure to Continuous Salt Spray'). No blistering or rusting from the cross-cut was observed after 4 weeks. Films cast from the neutralised latex were tested for water-vapour permeability over a two-week period. The permeability was found to be 34 g/m$^2$/0.001 in/day.

A film cast on a glass panel showed no sign of discolouration after being maintained at a temperature of 100° C. for 4 hours.

EXAMPLE 2

An aqueous copolymer latex comprising vinylidene chloride 70.6%, vinyl chloride 23.3%, 2-ethylhexyl acrylate 4.0% and acrylic acid 2.0% was prepared by a method similar to that described in Example 1. The weight of vinylidene chloride monomer employed was 2134 g.

5300 g of latex with a solids content of 49.9% were recovered from the autoclave. The latex had a minimum film-forming temperature of 15° C.

EXAMPLE 3

An aqueous copolymer latex comprising vinylidene chloride 68.9%, vinyl chloride 21.9%, 2-ethylhexyl acrylate 7.4% and acrylic acid 1.8% was prepared by a method similar to that described in Example 1. The weight of vinylidene chloride monomer employed was 1885 g.

5000 g of latex of solids content 42% w/w were removed from the autoclave. The latex had a minimum film-forming temperature of 6° C.

EXAMPLE 4

An aqueous copolymer latex comprising vinylidene chloride 68.1%, vinyl chloride 21.6%, butyl acrylate 8.7% and acrylic acid 1.6% was prepared by a method similar to that described in Example 1. The weight of vinylidene chloride monomer employed was 1702 g. 4685 g of latex with a solids content of 49.2% were removed from the autoclave. The latex had a minimum film-forming temperature of 18° C.

EXAMPLE 5 (Comparative Example)

By way of comparison a copolymer latex was prepared by the method described in Example 1 except that the proportions of the component monomers was as follows: vinylidene chloride 85%, vinyl chloride 7%, 2-ethylhexyl acrylate 6% and acrylic acid 2%, (i.e. the copolymer contained 92.5 parts by weight of vinylidene chloride per hundred parts by weight of the total vinylidene chloride and vinyl chloride.

A film of the copolymer cast on a glass panel showed severe discolouration after being maintained at 100° C. for 4 hours.

What is claimed is:

1. An aqueous latex of a copolymer capable of forming stable films which have excellent protective properties on metallic substrates, said films having good chemical resistance and low permeability to water vapour, said copolymer consisting essentially of (i) vinylidene chloride, (ii) vinyl chloride, (iii) one or more alkyl acrylates having from 1 to 12 carbon atoms in the alkyl group and/or one or more alkyl methacrylates having from 2 to 12 carbon atoms in the alkyl group and (iv) one or more aliphatic alpha-beta-unsaturated carboxylic acids, the proportion of vinylidene chloride being from 65 to 90 parts by weight, the proportion of the said alkyl acrylates and/or methacrylates being from 2 to 15 parts by weight and the proportion of the said carboxylic acids being from 0.2 to 8 parts by weight, per hundred parts by weight of the total vinylidene chloride and vinyl chloride.

2. A latex according to claim 1 wherein the proportion of vinylidene chloride is from 70 to 80 parts by weight per hundred parts by weight of the total vinylidene chloride and vinyl chloride.

3. A latex according to claim 1 wherein the proportion of the alkyl acrylate(s) and/or methacrylate(s) is from 4 to 10 parts by weight per hundred parts by weight of total vinylidene chloride and vinyl chloride.

4. A latex according to claim 1 wherein the proportion of the carboxylic acid(s) is from 1 to 4 parts by weight per hundred parts by weight of total vinylidene chloride and vinyl chloride.

5. A latex according to claim 1 containing 2-ethylhexyl acrylate as the alkyl acrylate.

6. A latex according to claim 1 containing butyl methacrylate or 2-ethylhexyl methacrylate as the methacrylate.

7. A latex according to claim 1 containing acrylic acid as the carboxylic acid.

8. A latex according to claim 1 characterised in that the minimum film-forming temperature is below 30° C.

9. A latex according to claim 8 having a minimum film-forming temperature in the range from −10° C. to 20° C.

10. A latex according to claim 9 having a minimum film-forming temperature in the range from 6° C. to 15° C.

11. An aqueous latex of a copolymer capable of forming stable films which have excellent protection properties on metallic substrates, said films having good chemical resistant and low permeability to water vapour, said copolymer consisting essentially of (i) vinylidene chloride, (ii) vinyl chloride, (iii) 2-ethylhexyl acrylate and (iv) acrylic acid, the proportion of vinylidene chloride being from 65 to 90 parts by weight, the proportion of 2-ethylhexyl acrylate being from 2 to 15 parts by weight and the proportion of acrylic acid being from 0.2 to 8 parts by weight, per hundred parts by weight of total vinylidene chloride and vinyl chloride.

12. A latex according to claim 1 wherein said aliphatic alpha-beta-unsaturated carboxylic acids are selected from the group consisting of acrylic acid, methacrylic acid, itaconic acid and citraconic acid.

* * * * *